United States Patent
Canalle

(10) Patent No.: US 6,571,487 B1
(45) Date of Patent: Jun. 3, 2003

(54) COMBINATION TAPE MEASURE, SQUARE AND FRAMING TOOL

(76) Inventor: John F. Canalle, 9102 Clark Rd., Richmond, IL (US) 60071

( * ) Notice: Subject to any disclaimer, the term of this patent is extended or adjusted under 35 U.S.C. 154(b) by 12 days.

(21) Appl. No.: 09/821,354

(22) Filed: Mar. 29, 2001

(51) Int. Cl.[7] .................................................. G01B 3/10
(52) U.S. Cl. ............................. 33/760; 33/769; 33/668
(58) Field of Search ............................... 33/760, 27.032, 33/42, 427, 429, 464, 474, 476, 755, 759, 761, 769, 668

(56) References Cited

U.S. PATENT DOCUMENTS

| | | | | |
|---|---|---|---|---|
| 3,526,964 A | * | 9/1970 | Clark, Jr. ....................... | 33/761 |
| 4,574,492 A | | 3/1986 | Miller | |
| D299,437 S | | 1/1989 | Kull | |
| 4,965,944 A | * | 10/1990 | Kuze et al. .................... | 33/760 |
| 5,077,910 A | | 1/1992 | Smith ........................... | 33/760 |
| D332,413 S | | 1/1993 | Douglas | |
| D333,103 S | | 2/1993 | Douglas | |
| D333,627 S | | 3/1993 | Douglas ........................ | D10/72 |
| 5,337,487 A | | 8/1994 | Mangino | |
| D390,794 S | | 2/1998 | Coetzee | |
| 5,735,052 A | * | 4/1998 | Lin ............................... | 33/760 |
| 5,809,662 A | * | 9/1998 | Skinner ......................... | 33/42 |
| 5,848,481 A | | 12/1998 | Parsons et al. ................ | 33/760 |
| 6,047,481 A | * | 4/2000 | Bond ............................ | 33/761 |
| 6,098,303 A | * | 8/2000 | Vogel ........................... | 33/759 |
| 6,237,237 B1 | * | 5/2001 | McKenna et al. ............. | 33/464 |

* cited by examiner

Primary Examiner—Christopher W. Fulton
(74) Attorney, Agent, or Firm—Greer, Burns & Crain, Ltd.

(57) ABSTRACT

A combination tape measure, square and framing tool comprises a substantially rectangular housing having dimensions of about 3 by 3½ by 1½ inches and a retractable tape measure. The housing has a front face, a back face and a top face. A first lip extends from the front face and forms a square with the side edges of the front face. A second lip extends from the top face and forms a square with the side edges thereof. A third lip extends form the back face of the housing and forms a square with the side edges thereof. The edges of the top, front and back faces are spaced 1½, 3 and 3½ inches apart, respectively. The tool may be used to layout, square and mark the location of standard 2×4 studs in a single step. Further features include extendable, ruled edge members and an arc marking device. The arc marking device comprises a pivot point adjacent a free end of the tape measure and an arc marking point on the housing.

20 Claims, 4 Drawing Sheets

COMBINATION TAPE MEASURE, SQUARE AND FRAMING TOOL

FIELD OF THE INVENTION

The present invention relates to hand tools, and in particular to combination tape measure, square and framing tools for carpenters, home owners and metal fabricators.

BACKGROUND OF THE INVENTION

A common task for carpenters and other tradesmen is laying out and marking various structures, such as top and bottom wall plates, cripple walls, single and double studs, rafter and ceiling joists, and single and double joist hangers. Layout is conventionally accomplished using a tape measure and square. For example, to layout and duplicate top and bottom wall plates a carpenter, using a tape measure and pencil, will measure and mark the proper centerline location for each single and double stud on one plate. For single stud locations, the carpenter will measure and mark points ¾ inch on each side of the centerline, as a conventional stud is 1½ inch wide. For double studs, marks are made 1½ inches on each side of the centerline. The carpenter will then use a square to score a line transversely across the plate at each mark. The other plate is then placed side-by-side with the first plate, and the square is used to transfer and duplicate each line onto the other plate. During the foregoing operation, the carpenter frequently alternates between using the tape measure and square. Effort and time is expended each time a different tool is used.

The prior art includes many hand tools that have attempted to meet these and other needs of carpenters and tradesmen. Among the prior art tools are those disclosed in U.S. Pat. No. 4,574,492 to Miller for "Combination Layout Tool and Square," U.S. Pat. No. 5,077,910 to Smith for "Carpenter's Measuring Square," U.S. Pat. No. 5,337,487 to Mangino for "Layout Tool," U.S. Pat. No. 5,848,481 to Parsons et al for "Combination Square and Tape Measure for Use with a Tool Belt," U.S. Pat. No. Des. 299,437 to Kull for "Combined Square and Tape Measure," U.S. Pat. No. Des. 333,103 to Douglas for "Combination Tape Measure and Square," U.S. Pat. No. Des. 333,627 to Douglas for "Combination Tape Measure and Square," and U.S. Pat. No. Des. 390,794 to Coetzee for "Tape Measure with Built in Square and Ruller," the disclosures of which are hereby incorporated by reference. However, these prior art tools have met with limited commercial success. A need remains for an improved combination tape measure, square and layout tool.

OBJECTS OF THE INVENTION

It is an object of the invention to provide a tool that combines a tape measure and one or more squares.

It is an object of the invention to provide a tool that is particularly adapted for efficient layout of framing structures.

It is a further object of the invention to provide a tool for laying out and marking circles and arcs.

SUMMARY OF THE INVENTION

The combination tape measure, square and framing tool of the invention comprises a substantially rectangular housing having dimensions of about 3 by 3½ by 1½ inches, and a retractable tape measure in the housing. The housing has a first face, a second face perpendicular to the first face, and a third face perpendicular to both the first and second faces. A first lip extends outwardly from the first face of the housing and is perpendicular to side edges of the first face that are transverse to the first lip. A second lip extends outwardly from the second face of the housing and is perpendicular to the side edges of the second face. Preferably, the housing has a third lip that extends from the third face, and which is perpendicular to the side edges of the third face. The structure of the housing thus forms three squares, with widths of 1½ inches, 3 inches and 3½ inches. These are the three basic measurements used in framing. The 1½ inch dimension is the short cross-sectional dimension of a 2×4. The 3½ inch dimension corresponds to the long cross-sectional dimension of a 2×4. The 3-inch dimension corresponds to the width of two bundled 2×4 s.

The tool of the invention not only combines the tape measure and square, it facilitates efficient and accurate framing layout. For example, a carpenter can use the tape measure feature of the invention to layout the centerlines of several studs on a base plate. After the centerlines are marked, the carpenter measures, squares and marks each stud location. Using the tool of the invention, the carpenter selects the face of the tool that corresponds to the desired stud width (i.e., 1½, 3 or 3½ inches), places the tool on the centerline mark, squares the tool to the base plate using the applicable projecting lip, and strikes lines on either side of the tool. Thereby, the stud location is accurately measured, squared and marked in a single step.

The preferred embodiment of the tool of the invention further comprises a member slidably held in the housing flush with one of the faces at one of the side edges of the face. The member is extendable from the housing such that the edge is extended. Thereby, the length of the marking edge of the square may be extended from 3 or 3½ inches to 5½ inches or more. Further, the sliding member when extended forms another square in relation to the side of the tool from which the member extends. Preferably, the member is lined to form a measuring rule. A second member is optionally slideably held in the housing flush with another face of the tool and extends outwardly from the housing in a direction perpendicular to that of the first slidable member.

Another desirable feature of the preferred embodiment of the tool of the invention is an arc marking feature. The arc marking feature comprises a pivot point on the tape measure adjacent a free end thereof and a marking point on the housing. The pivot point is preferably a hole in the tape measure located a predetermined distance D from the free end thereof. The hole can be sized to receive an 8d nail. The nail is driven partly into a substrate at the center point of a desired arc. The tape is extended from the housing to a predetermined radius and is locked in position. The marking point on the housing may desirably be a notch in the side of the housing, which notch is spaced the same distance D from the point where the tape emerges from the house, at which the radius distance is set. Holding a pencil on the side of the housing at the marking point, a carpenter may readily mark the desired radius on the substrate.

The combination tape measure, square and framing tool thus fills the need in the trade for an improved framing layout tool. Further objects and advantages of the invention will become apparent from the following detailed description read in conjunction with the drawings.

DETAILED DESCRIPTION OF THE PREFERRED EMBODIMENT

Figure 1:
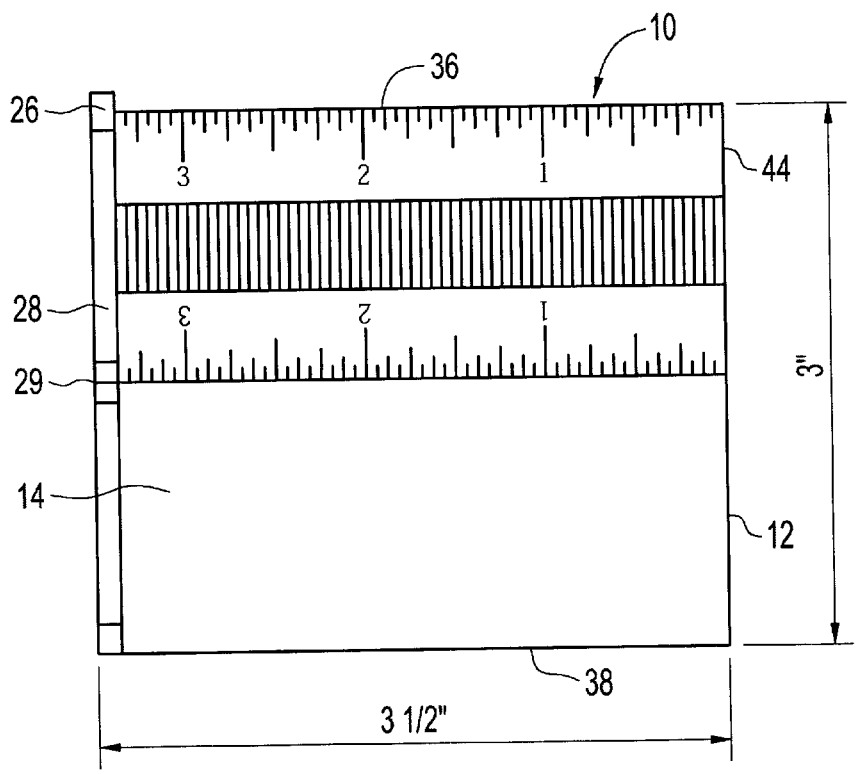
FIG. 1 is an elevational view of a front face of the combination tape measure, square and framing tool of the invention.

Turning now to the drawings, a combination tape measure, square and framing tool 10 is shown. The tool comprises a substantially rectangular housing 12 having dimensions of about 3 by 3½ by 1½ inches. The housing has a front face 14, a back face 16, a top face 18, right face 20, left face 22, and bottom face 24. A first lip 26 extends from one face, namely the top face 18, of the housing. A second lip 28 extends from a second face, e.g., the front face 14, of the housing. A third lip 30, extends form a third face, e.g., the back face 16, of the housing. The first lip 26 forms a right angle with top face 18, such that a front edge 32 and back edge 34 of top face 18 are perpendicular to lip 26. Thereby, lip 26 and edges 32/34 form squares. Furthermore, as edges 32 and 34 are spaced 1½ inches apart, see FIG. 5, a framing layout of a standard 2×4 stud may be squared and marked in a single step.

Similarly, the second lip 28 forms a right angle with front face 14, such that a top edge 36 and bottom edge 38 of top face 14 are perpendicular to lip 28. Thereby, lip 28 and edges 36/38 form squares. As edges 36 and 38 are spaced 3 inches apart, see FIG. 1, the location and marking of the long dimension of a standard 2×4 stud may be squared and marked in a single step. Second lip 28 optionally includes a centering notch 29, to facilitate centering the housing 12.

Figure 2:
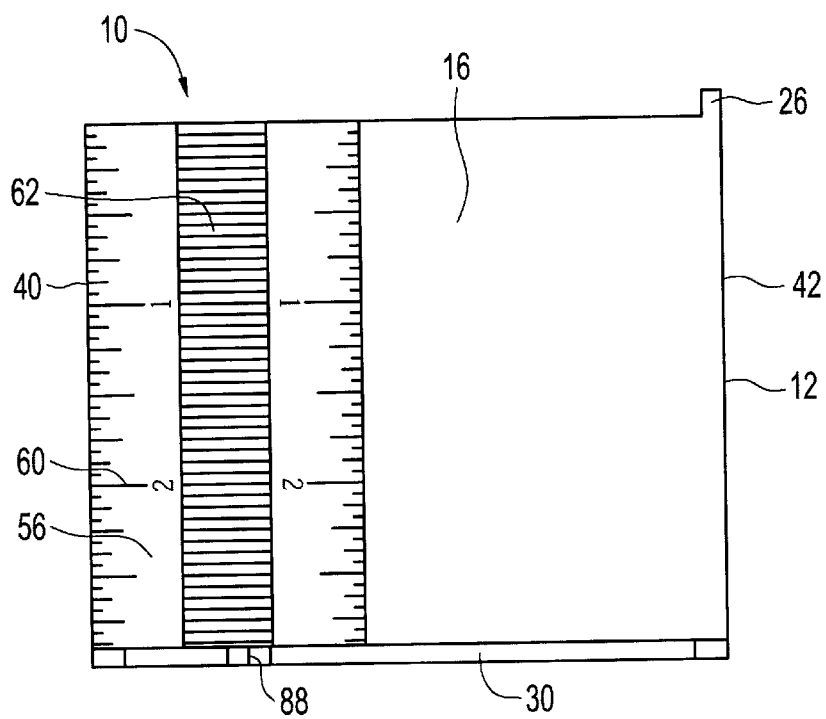
FIG. 2 is an elevational view of a back face of the combination tape measure, square and framing tool of the invention.

The third lip 30 forms a right angle with back face 16, such that a right edge 40 and left edge 42 of back face 16 are perpendicular to lip 30. Thereby, lip 30 and edges 40/42 form squares. As edges 40 and 42 are spaced 3½ inches apart, see FIG. 2, the location and marking of two bundled 2×4 studs may be squared and marked in a single step.

Whereas the preferred embodiment has three lips, it is to be understood that the benefits of the invention may be achieved with more or less than three lips. Further, the designation of the respective lips as first, second and third, is for convenience in describing the tool. Alternatively, the various lips can be re-named, numbered or designated in any manner, for example the lip 28 alternatively could be designated the first lip. Further, it is to be understood that reference to the various sides of the housing as front, back, top, bottom, left and right (or first, second and third) is for convenience, and each side may be re-labeled or designated in any manner, and use of these terms is not a limitation on the invention as defined by the appended claims.

Figure 5:
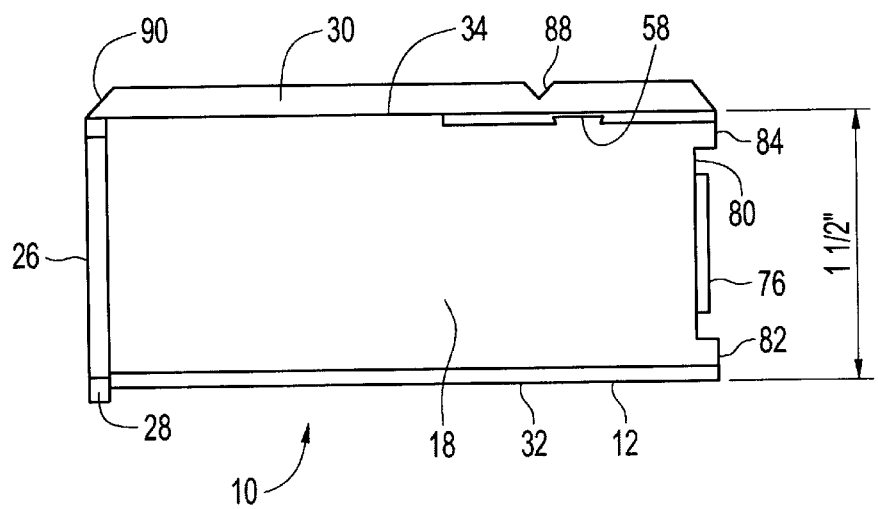
FIG. 5 is a top plan view of the combination tape measure, square and framing tool of the invention.
Figure 6:
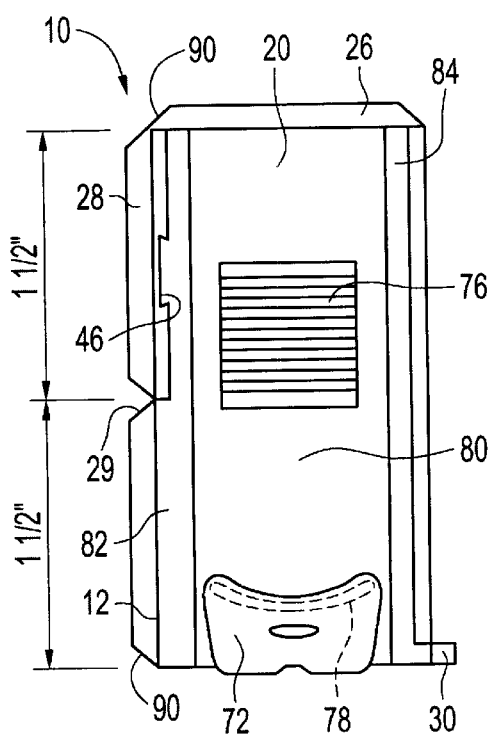
FIG. 6 is a left side elevational view of the combination tape measure, square and framing tool of the invention.
Figure 7:
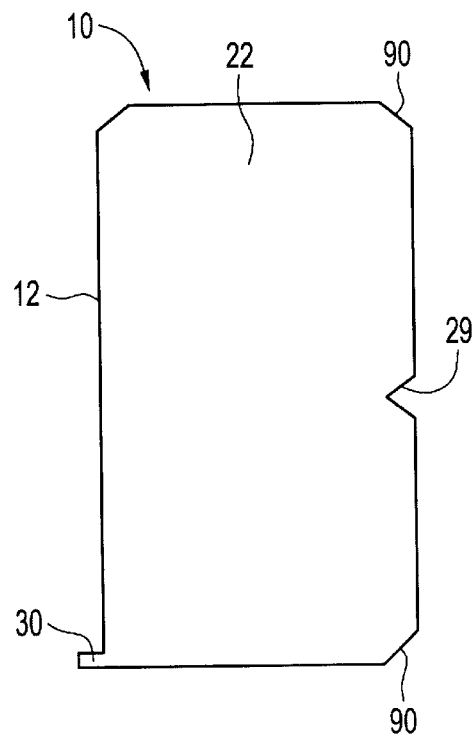
FIG. 7 is a right side elevational view of the combination tape measure, square and framing tool of the invention.
Figure 8:
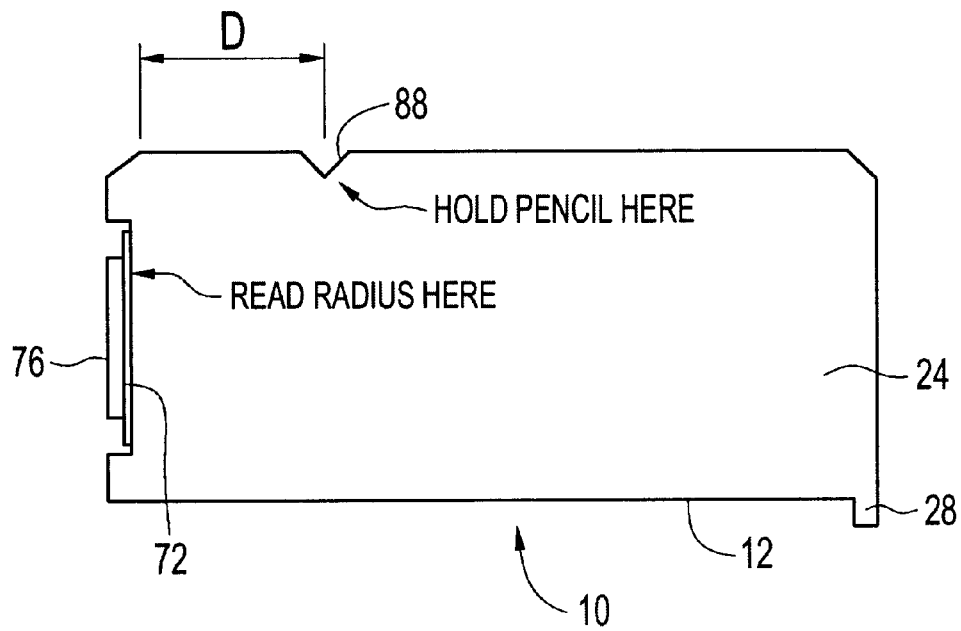
FIG. 8 is a bottom plan view of the combination tape measure, square and framing tool of the invention.
Figure 9:
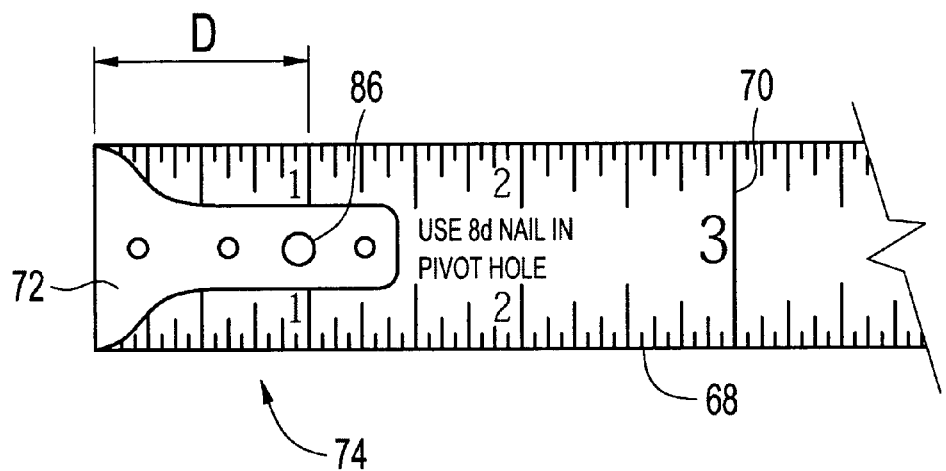
FIG. 9 is a plan view of a free end of retractable tape measure of the invention.

The first lip 26 is shown at the left side of housing 12, but alternatively may be on the right side. Similarly, edge 28 is shown on the left side of the housing, but could be on the right side. And, whereas edge 30 is on the bottom of housing 12, it could be relocated to the top edge. Preferably, lips 26 and 28 are in the same plane, as shown in FIGS. 1 and 5, however, they may be in separate planes. These modifications of the invention will be apparent to those skilled in the art, and the appended claims are intended to encompass these and other minor modifications.

The tool 10 of the invention preferably includes one or more sliding members. A first sliding member 44 is located in the housing 12 flush with front face 14. Member 44 is slidably mounted to housing 12 in any conventional manner, such as a dovetail, tongue and groove joint 46. Member 44 is desirably ruled 48 and knurled 50 for finger grip. Member 44 may be removed or fixed to the housing. Any simple mechanism, such as a stop (not shown), may be used to prevent the member 44 from being removed from housing 12, if desired.

Figure 3:
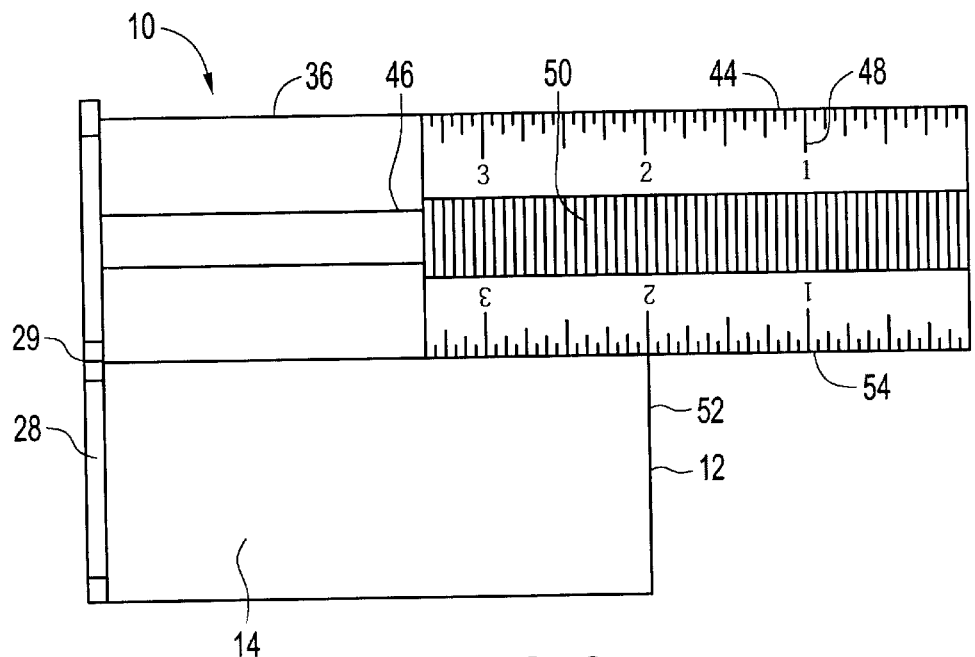
FIG. 3 is a front face elevational view the same as FIG. 1, but with a sliding rule extended.

Sliding member 44 serves several functions. It may be used to adjustably extend edge 36. Member 44 is perpendicular with face 20 and thereby forms yet another square between edges 52 and 54 as seen in FIG. 3. Preferably member 44 has a width of 1½ inches and thus may be used to center the 3-inch side of the tool. Finally, member 44 may be used to measure short distances.

Figure 4:
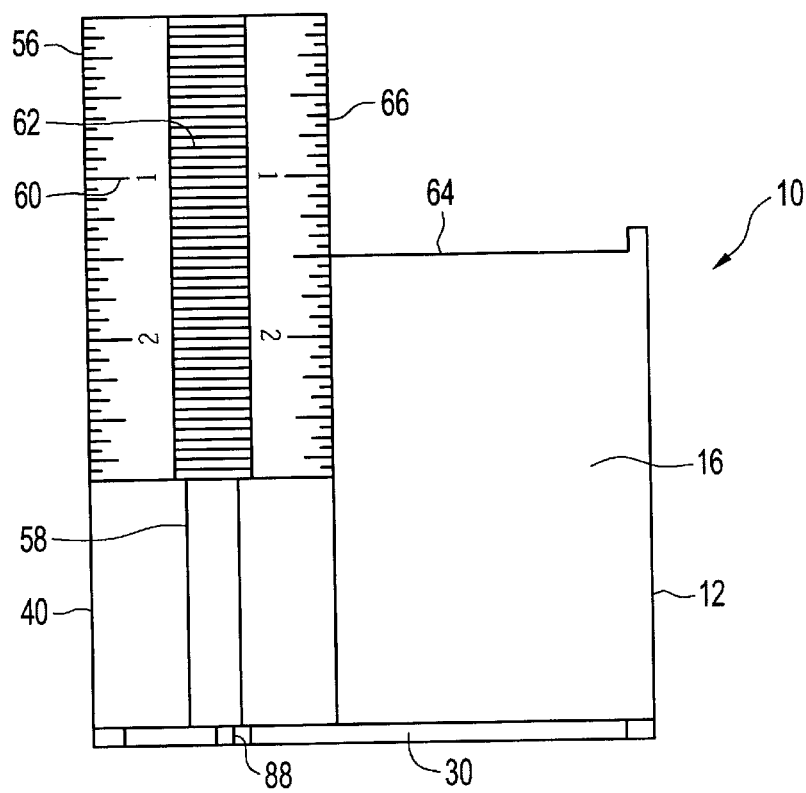
FIG. 4 is a rear face elevational view the same as FIG. 2, but with a sliding rule extended.

A second sliding member 56 can be mounted flush with the rear face 16 of housing 12. Desirably, the second sliding member is mounted to extend in a direction perpendicular to the first sliding member 44, as best seen by comparing FIGS. 3 and 4. As with the first sliding member, the second can be mounted with a tongue and groove joint 58, is ruled 60 and knurled 62. Member 56 functions to extend edge 40. Further, a square is formed between edges 64 and 66. The width of member 56 is illustrated as 1½ inches to correspond to the width of a standard 2×4, but optionally may be 1¾ inches so as to bifurcate the 3½ inch side of housing 12, thereby providing a means for centering the 3½ inch side of housing 12.

A tape measure 68 is retractably held in housing 12 in any manner well known in the art. The tape measure is ruled 70 and includes a tab 72 on free end 74. The tape may be locked in position by means of a lock button 76. The tape measure 68 emerges from housing 12 through an opening 78 in the right face 20. Desirably, at least a portion 80 of face 20 is recessed into housing 12 so that lock button 76 and tab 72 do not project outwardly relative to edges 82 and 84 of face 20. Thereby, edges 82 and 84 may be used as squares without being obstructed by lock button 76. Further, it is desirable to space opening 78 slightly higher than in conventional tape measures so as to limit or prevent tab 72 from projecting past the plane of bottom face 24.

The tool of the invention further includes means for measuring and marking arcs. The arc measuring means comprises a pivot point 86 on tape measure 68 adjacent the free end 74 and an arc marking point 88 on said housing adjacent the opening 78 in housing 12. The pivot point 86 may be formed in any manner. A preferred pivot point comprises a hole in the tape measure sized to receive an 8d nail. Marking point 88 may be formed in any manner, a preferred marking point comprising a notch in lip 30. Pivot point 86 is preferably spaced a distance D from the free end 74 of tape measure 68. The marking point 88 is spaced the same distance D from a tape reading point, i.e., the point at which the tape measure is read. Typically, the tape reading point is the opening 78 where the tape measure emerges from the housing 12. An arc may be measured and drawn by inserting an 8*d* nail in pivot point hole 86 and partially driving the nail into a substrate at the center point of the desired arc. The tape measure 68 is then extended to the predetermined radius and locked in position via lock button 76. A pencil or awl is then held in marking point 88. The arc is drawn by holding the housing 12 with a slight pressure in a radially outward direction and then by sweeping the tool in arc about the pivot point with the pencil or awl pressed against the substrate.

The housing and tape measure of the invention may be fabricated and assembled in any conventional manner. The housing and sliding members are preferably molded from plastic, but may be fabricated from metal. The tape measure may be made of any suitable materials, such as plastic coated steel. The corner edges 90 of housing 12 are preferably chamfered or rounded as shown.

While the preferred embodiment of the present invention has been shown and described, it is to be understood that it is merely the best mode for practicing the invention that is contemplated at the present time, and that various modifications and changes could be made thereto without departing from the scope and spirit of the invention as defined in the appended claims.

What is claimed is:

1. A hand tool comprising:
   a housing having a first face and a second face, said first face having two, parallel edges spaced apart by a first distance, and said second face having two parallel edges spaced apart by a second distance, said second distance different from said first distance;
   a first lip projecting outwardly from said first face extending substantially between and perpendicular to said two, parallel edges of said first face, whereby said first lip and said two edges of the first face form squares;
   a second lip projecting outwardly from said second face extending substantially between and perpendicular to said two, parallel edges of said second face, whereby said second lip and said two edges of the second face form squares; and
   a retractable tape measure at least partly held in said housing.

2. A tool as in claim 1, wherein said housing further comprises a third face having two parallel edges, and a third lip projecting outwardly from said third face in between and perpendicular to said two, parallel edges of said third face, whereby said third lip and said two edges of the third face form squares.

3. A tool as in claim 1, wherein said first distance is selected from the group of 1½, 3 or 3½ inches, and said second distance is selected from the group of 1½, 3 or 3½ inches.

4. A tool as in claim 1, wherein said first and said second lips are in the same plane.

5. A tool as in claim 1, wherein said first face has dimensions of about 3 by 3½ inches, said first lip being adjacent a 3 inch side of said first face, said first lip having a center-line mark at the mid-point of the 3 inch side of said first face.

6. A tool as in claim 1, further comprising:
   a first member slidably held in said housing flush with one of said faces and adjacent an edge of said one face, said first member being extendable outwardly from said housing.

7. A tool as in claim 6, wherein said first member is ruled.

8. A tool as in claim 6, further comprising:
   a second member slidably held in said housing flush with another of said faces and adjacent a side edge of said another face, said second member being extendable outwardly from said housing in a direction perpendicular to said first member.

9. A tool as in claim 1, wherein said tape measure has a free end, further comprising:
   a pivot point on said tape measure adjacent the free end thereof; and
   an arc marking point on said housing.

10. A tool as in claim 9, wherein said pivot point is spaced a distance D from the free end of said tape measure, and said arc marking point is spaced substantially the same distance D from a tape measure reading point between said tape measure and said housing.

11. A tape measure as in claim 1 further comprising a tape measure lock recessed in said housing.

12. A tool comprising:
    a housing having a front face, a right face perpendicular to said front face, a bottom face perpendicular to both said front and right faces, a back face parallel to said front face, a top face parallel to said bottom face, and a left face parallel to said right face;
    a first lip in the plane of one of said left face or right face of said housing extending outwardly from said housing adjacent to one of said front face or back face, said first lip being perpendicular to two, parallel edges of said front face or back face; and
    a second lip in the same or parallel plane as said first lip and extending outwardly from said housing adjacent one of said top face or bottom face, said second lip being perpendicular to two, parallel edges of said top face or bottom face.

13. A tool as in claim 12, further comprising:
    a third lip in the plane of one of said bottom face or top face extending outwardly from said housing adjacent one of said front face or back face, said lip being perpendicular to two, parallel side edges of said front face or back face.

14. A tool as in claim 12, further comprising:
    a first member slidably held in said housing flush with said front face adjacent one side thereof, said first member being extendable from said housing.

15. A tool as in claim 14, further comprising:
    a second member slidably held in the back face of said housing, said second member adjacent a side edge of said back face and extending outwardly from said housing in a direction perpendicular to that of said first member.

16. A tool as in claim 12, wherein said two, parallel edges of the first face are spaced apart by a distance selected from the group of 1½, 3 or 3½ inches, and said two, parallel edges of the second face are spaced apart by another distance selected from the group of 1½, 3 or 3½ inches.

17. A tool comprising:
    a substantially rectangular housing having dimensions of about 3 by 3½ by 1½ inches, said housing having a front face, a left side face perpendicular to said front face, a bottom face perpendicular to both said front and left side faces, a back face parallel to said front face, a top face parallel to said bottom face, and a right side face parallel to said left face;
    a first member slidably held in said housing flush with said front face and adjacent a side edge of said front face, said first member being extendable from said housing; and
    a second member slidably held in said housing flush with said back face and adjacent a side edge of said back face, said second member extending outwardly from said housing in a direction perpendicular to that of said first member.

18. A tool as in claim 17, wherein at least one of said members is about 1½ inch wide and one edge thereof bifurcates a 3 inch dimension of said housing.

19. A tool comprising:

a substantially rectangular housing having dimensions of about 3 by 3½ by 1½ inches, said housing having a front face, a left side face perpendicular to said front face, a bottom face perpendicular to both said front and left side faces, a back face parallel to said front face, a top face parallel to said bottom face, and a right side face parallel to said left face;

a first lip in the plane of one of said left face or right face of said housing extending outwardly from said housing adjacent to one of said front face or back face to form a right angle between said first lip and the side edges of said front face or back face;

a second lip in the same plane as said first lip and extending outwardly from said housing adjacent one of said top face or bottom face to form a right angle between said second lip and the side edges of said top or bottom face;

a third lip in the plane of one of said bottom face or top face extending outwardly from said housing adjacent one of said front face or back face and forming a right angle between said first lip and the side edges of said front face or back face;

a first ruled member slidably held in said housing flush with said front face, said first ruled member being extendable from said housing;

a second ruled member slidably held in said housing flush with said back face, said second ruled member extending outwardly from said housing in a direction perpendicular to that of said first ruled member;

a tape measure retractably held in said housing, said housing having a tape measure reading point, said tape measure having a pivot point spaced a distance D from a free end thereof;

an arc marking point on said housing spaced a distance D from the tape measure reading point on said housing; and a tape retraction lock on said housing, said lock being recessed in said housing.

20. A hand tool, comprising:

a housing having first face, a second face perpendicular to said first face, and a third face perpendicular to both said first and said second faces;

a first lip extending outwardly from the first face of said housing perpendicular to two parallel side edges of the first face, said side edges of the first face being spaced apart by about 1½ inches;

a second lip extending outwardly from the second face of said housing perpendicular to two, parallel side edges of the second face, said side edges of the second face being spaced apart by about 3 inches;

a third lip extending outwardly from the third face of said housing perpendicular to two parallel side edges of the third face, said side edges of the third face being spaced apart by about 3½ inches; and a retractable tape measure at least partly held in said housing.

\* \* \* \* \*